United States Patent

Weckesser et al.

(10) Patent No.: US 8,802,046 B2
(45) Date of Patent: Aug. 12, 2014

(54) GRANULAR POLYCRYSTALLINE SILICON AND PRODUCTION THEREOF

(71) Applicants: Dirk Weckesser, Altoetting (DE); Rainer Hauswirth, Kirchdorf (DE)

(72) Inventors: Dirk Weckesser, Altoetting (DE); Rainer Hauswirth, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/861,950

(22) Filed: Apr. 12, 2013

(65) Prior Publication Data

US 2013/0280533 A1 Oct. 24, 2013

(30) Foreign Application Priority Data

Apr. 19, 2012 (DE) .......................... 10 2012 206 439

(51) Int. Cl.
  *C01B 33/02* (2006.01)
  *C01B 33/027* (2006.01)
(52) U.S. Cl.
  CPC .................................... *C01B 33/027* (2013.01)
  USPC ........... 423/349; 423/341; 423/342; 423/347; 423/348; 502/232
(58) Field of Classification Search
  USPC .................. 423/341, 342, 347–349; 502/232
  See application file for complete search history.

(56) References Cited

U.S. PATENT DOCUMENTS

| 4,148,931 | A | | 4/1979 | Reuschel et al. | |
| 5,037,503 | A | | 8/1991 | Kajimoto et al. | |
| 5,077,028 | A | * | 12/1991 | Age | .............................. 423/350 |
| 6,007,869 | A | | 12/1999 | Schreieder et al. | |
| 2008/0299291 | A1 | | 12/2008 | Weidhaus et al. | |
| 2011/0059004 | A1 | | 3/2011 | Stocklinger | |
| 2012/0058040 | A1 | | 3/2012 | Haeckl et al. | |
| 2012/0070362 | A1 | * | 3/2012 | Harms et al. | .................. 423/349 |

FOREIGN PATENT DOCUMENTS

| DE | 19735378 | A1 | | 2/1999 | |
| DE | 102007021003 | A1 | | 11/2008 | |
| DE | 102009043946 | A1 | | 3/2011 | |
| DE | 102010040293 | A1 | | 3/2012 | |
| JP | 2005336045 | A | * | 12/2005 | ............ C01B 33/035 |

OTHER PUBLICATIONS http://www.sympatec.com/EN/ImageAnalysis/Fundamentals.html (of May 17, 2013) in English for http://www.sympatec.com/DE/ImageAnalysis/Fundamentals.html (of Mar. 11, 2013) in German.

* cited by examiner

*Primary Examiner* — Kaj K Olsen
*Assistant Examiner* — Pritesh Darji
(74) *Attorney, Agent, or Firm* — Caesar, Rivise, Bernstein, Cohen & Pokotilow, Ltd.

(57) ABSTRACT

Granular polycrystalline silicon is disclosed, which has a convexity of 0.850-1.000 and a chlorine content of 10-40 ppmw. Also disclosed is a process for producing granular polycrystalline silicon in a fluidized bed reactor, which includes: (a) fluidization of silicon seed particles by gas flow in a fluidized bed heated by a heating apparatus, (b) addition of a silicon- and halogen-containing reaction gas resulting in pyrolytic deposition of elemental silicon on heated seed particle surfaces, (c) forming the granular polycrystalline silicon, (d) removing from the reactor particles and offgas containing hydrogen halide, and (e) metered addition of fresh seed particles. The hydrogen halide concentration in the offgas is determined as the controlled variable. The rate of metered addition of fresh seed particles and heating output of the heating apparatus are controlled as manipulated variables to keep the hydrogen halide concentration in the offgas within an above-defined range during operation.

9 Claims, 2 Drawing Sheets

GRANULAR POLYCRYSTALLINE SILICON AND PRODUCTION THEREOF

BACKGROUND OF THE INVENTION

The invention relates to granular polycrystalline silicon and to production thereof.

Granular polycrystalline silicon, or granular polysilicon for short, is an alternative to the polysilicon produced in the Siemens process. While the polysilicon in the Siemens process is obtained as a cylindrical silicon rod which has to be comminuted prior to further use thereof in a time-consuming and costly manner to give what is called chip poly, and may again have to be purified, granular polysilicon has bulk material properties and can be used directly as a raw material, for example for single crystal production for the photovoltaics and electronics industry.

Granular polysilicon is produced in a fluidized bed reactor. This is accomplished by fluidization of silicon particles by means of a gas flow in a fluidized bed, the latter being heated to high temperatures by means of a heating apparatus. Addition of a silicon-containing reaction gas results in a pyrolysis reaction at the hot particle surface. This deposits elemental silicon on the silicon particles, and the individual particles grow in diameter. The regular removal of particles which have grown and addition of relatively small silicon particles as seed particles enable continuous operation of the process with all the associated advantages. The silicon-containing reactant gas used may comprise silicon-halogen compounds (e.g. chlorosilanes or bromosilanes), monosilane ($SiH_4$) and mixtures of these gases with hydrogen. Such deposition processes and apparatuses for this purpose are known, for example, from US2008299291.

A factor of great significance for performance of granular polysilicon in its applications is a defined, constantly low halogen content.

Performance is understood to mean, for example, the avoidance of spattering effects in the course of crystal pulling.

Halogens such as chlorine constitute a main impurity in polysilicon production if halosilanes such as trichlorosilane, in which halogens are present in large amounts, are used as a precursor.

It is known that the chlorine content which is established in the polysilicon product depends on the process conditions in the fluidized bed reactor.

For instance, U.S. Pat. No. 5,077,028 already discloses that, with rising linear growth rate, a lower chlorine content in the product can be obtained. It is possible to produce granular polysilicon with a chlorine content of less than 20 ppmw at a crystal growth rate of greater than 0.4 µm/min. In order to ensure such a crystal growth rate, the temperature and residence time should be adjusted accordingly. A chlorine content of less than 20 ppmw ensures that no scattering effects occur in the course of crystal pulling.

U.S. Pat. No. 5,037,503 discloses the production of single silicon crystals using granular polysilicon having a chlorine content of less than 15 ppmw (deposition with trichlorosilane) or a hydrogen content of 7.5 ppmw (deposition with silane). In the case of use of such granular polysilicon, no spattering effects occur in the course of crystal pulling.

U.S. Pat. No. 6,007,869 claims granular polysilicon having a chlorine content of 6-47 ppmw. As a result of the low chlorine content, adverse effects are avoided in the course of CZ pulling, such as poor single crystal quality, spattering effects and formation of corrosive gases. For production of the granular polysilicon, a reaction gas temperature greater than 900° C. and a particle temperature greater than 1000° C. have to be selected.

In the prior art, online analysis is used for process control in various production processes.

DE102009043946 discloses a method for controlling a system for the production of polycrystalline silicon, wherein the system comprises at least one reactor with at least one inlet pipe and an outlet pipe for a mixture of gases, characterized by the following steps:

withdrawing specimens to be measured from the inlet pipe and the outlet pipe of each reactor;

feeding the withdrawn specimens to be measured to at least one gas-phase chromatograph via a pipe in each case;

obtaining controlling signals on the basis of the measurements with respect to the composition of the fed specimens to be measured obtained by the gas-phase chromatograph; and adjusting a plurality of parameters of the at least one reactor on the basis of the obtained controlling signals by means of a control unit via actuators in such a way that the efficiency of the system automatically results in a production optimum.

U.S. Pat. No. 4,148,931A discloses a process for depositing elemental silicon from a reactive gas comprised of a mixture of a halogen silane and hydrogen over heated carrier bodies (Siemens process), wherein the concentration of hydrogen halide in an exhaust gas is monitored and used to control the supply of the reactive gas so as to regulate the flow of reaction gas in such a manner that the concentration of said hydrogen halide in the exhaust gas remains chronologically substantially constant. This is done by using the content of hydrogen halide in the exhaust gas as a controlled variable for control of the manipulated variable of the input gas flow. The aim is to maintain a specific deposition rate remaining constant over the reaction process.

It has been found that the aforementioned processes lead to polysilicon which avoids spattering effects in the course of crystal pulling owing to the low chlorine content, but causes some stacking faults.

In addition, the bulk material properties and the fluidization properties of the particles, and much more significantly of the chip poly too, are unsatisfactory.

A further disadvantage occurs in the measurement of the fluidized bed temperature. Dust formation disrupts the temperature measurement, and it cannot be used as a controlled variable for control of the reactor for a stable product quality.

The problems described gave rise to the objective of the present invention.

DESCRIPTION OF THE INVENTION

The object of the invention is achieved by granular polycrystalline silicon having a chlorine content of 10-40 ppmw, the particles having a convexity of 0.850-1.000.

Particular preference is given to particles having a convexity of 0.990-1.000.

Such convexity gives rise to optimal bulk material properties and fluidization properties of the granular polycrystalline silicon. In addition, it is possible to avoid the formation of agglomerates and hence the formation of impurity inclusions.

The granular polycrystalline silicon particles preferably have a mean surface roughness $R_a$ of less than 50 nm.

The granular polycrystalline silicon preferably has a nitrogen content of 10-2000 ppba, more preferably 10-100 ppba.

Granular polycrystalline silicon having a nitrogen content less than 2000 ppba avoids stacking faults in the course of crystal pulling.

Moreover, in the case of CZ pulling, there are already no spattering effects when the chlorine content is in the range of 10-40 ppmw.

In addition, the granular polycrystalline silicon has a particle size of 150 to 10,000 μm, the mass-based median of the distribution being between 850 and 2000 μm.

The particle size distribution of the granular polycrystalline silicon preferably has a width of 0.4<CV<0.7. CV denotes a coefficient of variation.

The aforementioned particle sizes and particle size distribution allow easier handling of the particles in the charging of the crucible in the CZ process, or in the recharging of granular polysilicon. In addition, spattering effects in the CZ process are also avoided as a result.

The granular polycrystalline silicon preferably has a sphericity of 0.750-1.000.

Particular preference is given to a sphericity of 0.900-0.999.

Very particular preference is given to a sphericity of 0.995-0.999.

The granular polycrystalline silicon is preferably characterized by a color according to the HSL color space of 0<H<255, 0<S<13 and 90<L<200.

The object of the invention is also achieved by a process for producing granular polycrystalline silicon in a fluidized bed reactor, comprising fluidization of silicon seed particles by means of a gas flow in a fluidized bed which is heated by means of a heating apparatus, addition of a silicon- and halogen-containing reaction gas resulting in deposition of elemental silicon on the hot seed particle surfaces by means of pyrolysis, forming the granular polycrystalline silicon, with removal of particles whose diameter has grown as a result of deposition and an offgas comprising hydrogen halide from the reactor and metered addition of fresh seed particles, characterized in that the concentration of hydrogen halide in the offgas is determined as the controlled variable and a rate of metered addition of fresh seed particles and a heating output of the heating apparatus are controlled as manipulated variables, in order to keep the hydrogen halide concentration in the offgas within an above-defined range during operation, and further characterized in that the granular polycrystalline silicon comprises particles having a convexity of 0.850-1.000.

The growth rate of the particles is determined by the metering rate of fresh seed particles and the heating output, and is regulated by an external controlled variable, namely the concentration of hydrogen halide in the reactor offgas.

If the silicon- and halogen-containing reaction gas used is trichlorosilane, which is preferred, the deposition reaction forms HCl. In this case, the HCl concentration in the offgas serves as the controlled variable.

The regulation allows the chlorine content in the granular silicon to be adjusted to a range of 10 to 50 ppmw.

Preference is given to a chlorine content in the granular polycrystalline silicon of 10 to 40 ppmw, more preferably 10-25 ppmw.

The temperature of the fluidized bed in the reaction region is preferably from 850° C. to 1100° C., more preferably from 900° C. to 1050° C., most preferably from 920° C. to 970° C.

Preference is given to fluidizing the seed particles using hydrogen.

The reaction gas can be injected into the fluidized bed via one or more nozzles.

The local gas velocities at the outlet of the nozzles are preferably 1 to 160 m/s.

The concentration of the silicon-containing reaction gas, based on the total gas volume stream flowing through the fluidized bed, is preferably 10 mol % to 50 mol %, more preferably 15 mol % to 40 mol %.

The concentration of the silicon-containing reaction gas in the reaction gas nozzle, based on the total gas volume stream flowing through the reaction gas nozzles, is preferably 20 mol % to 80 mol %, more preferably 30 mol % to 60 mol %.

The bed weight is preferably 100 to 200 kg.

The reactor heating output to be controlled varies preferably from 100 to 200 kW.

The reactor pressure varies within the range from 0 to 7 bar gauge, preferably in the range of 0.5 to 3.5 bar gauge.

The seed particle metering rate to be controlled varies preferably from 1.0 to 2.5 kg/h.

In the case of a reactor having a diameter of, for example, 400 mm, the mass flow rate of trichlorosilane is preferably 200 to 400 kg/h. The hydrogen volume flow rate is preferably 100 to 300 m$^3$ (STP)/h. For larger reactors, higher amounts of TCS and H2 are preferred. It will be clear to the person skilled in the art that some process parameters are ideally selected as a function of the reactor size. In the case of larger reactors, for example in the case of a reactor of diameter 600 mm, the reactor heating output, seed particle metering rate and bed weight are also preferably higher than the aforementioned values.

The mean diameter of the seed particles is preferably at least 400 μm.

The residence time of the reaction gas in the fluidized bed is preferably 0.1 to 10 s, more preferably 0.2-5 s.

It has been found that a stable and long reactor running time can be accomplished with the process, which is particularly advantageous. Surprisingly, a stable process leads to granular polycrystalline silicon with improved convexity. In addition, the result is spherical granular silicon with low mean surface roughness.

Overheating of the reactor can be avoided by monitoring the HCl concentration in the offgas.

BRIEF DESCRIPTION OF THE DRAWINGS

The invention is illustrated in detail below by FIGS. 1 to 3.

DESCRIPTION OF THE FLUIDIZED BED REACTOR

In the context of this invention, the granular polysilicon is produced in a fluidized bed reactor.

Figure 1:
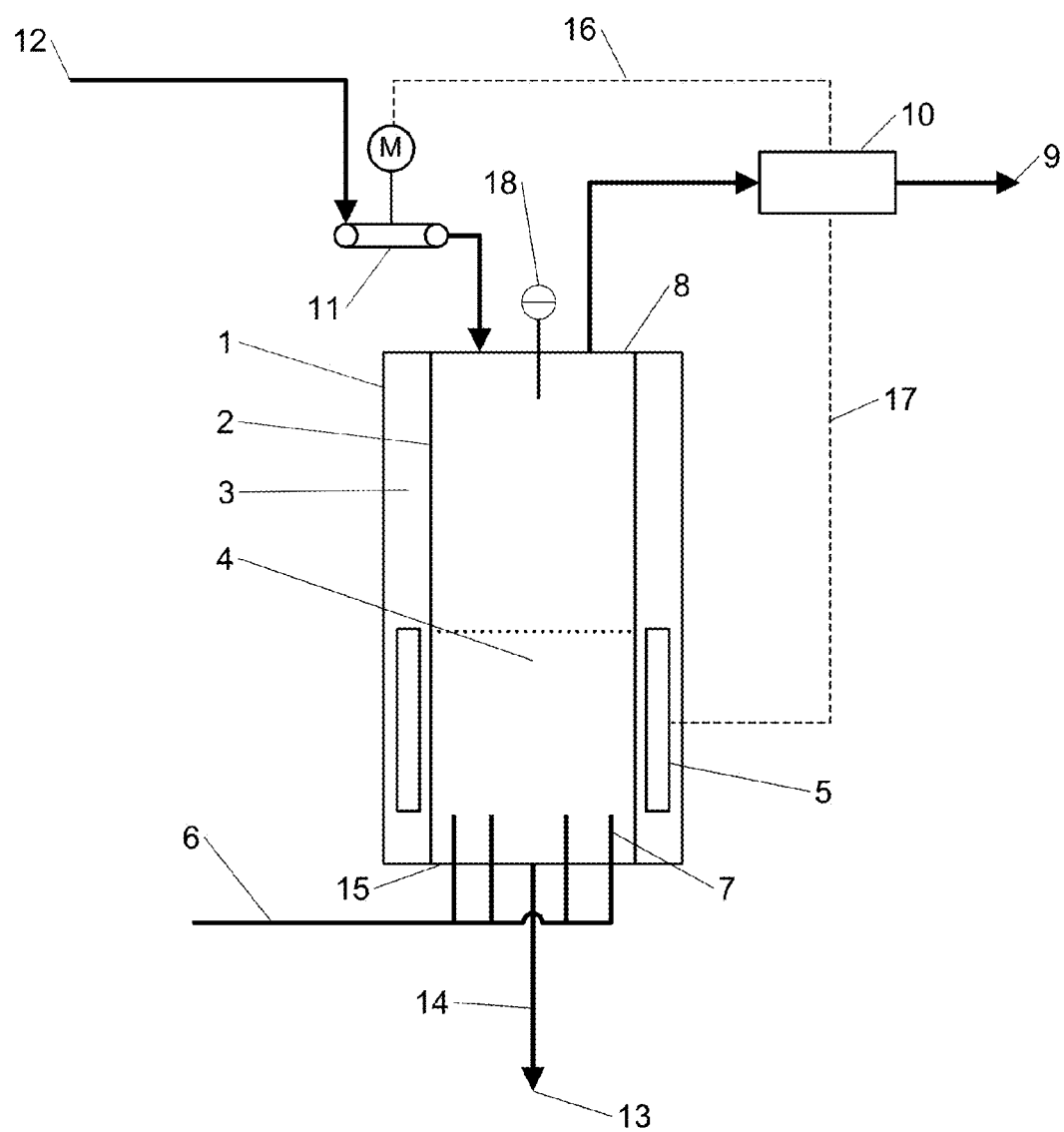
FIG. 1 shows a reactor for performance of the process.

FIG. 1 shows a diagram of the fluidized bed reactor.

The fluidized bed reactor consists of a vessel 1, into which a reactor tube 2 has been inserted.

Between the inner wall of the vessel and the outer wall of the reactor tube is an intermediate space 3.

Within the reactor tube is the fluidized bed 4 comprising the granular polycrystalline silicon.

The fluidized bed is heated by means of a heating apparatus 5.

The input gases 6 are supplied to the reactor via feed gas lines at the reactor base 15. They are metered into the reactor interior in a controlled manner via nozzles 7.

At the top of the reactor 8, the reactor offgas 9 is drawn off.

In the offgas line is a gas chromatograph 10 for online analysis.

At the top of the reactor 8 is a pyrometer 18 for measurement of the fluidized bed temperature.

A supply device 11 is used to supply seed particles 12 to the reactor at the top of the reactor 8.

The granular polysilicon product 13 is withdrawn at the reactor base 15 through a withdrawal line 14.

Between the gas chromatograph 10 and the supply device 11 for seed particles is a control system 16.

A further control system 17 is between the gas chromatograph 10 and the heating apparatus 5.

In order to monitor the process, various parameters are measured directly or indirectly during reactor operation.

In the reactor offgas, all offgases from the deposition reaction are detected and quantified by means of the online analysis.

These are principally chlorosilanes, hydrogen chloride and hydrogen.

The measurement device used for the offgas analysis is a gas chromatograph.

The HCl content, the controlled variable used in the control system, is measured via the online analysis by means of gas chromatograph 10 and is reported in the unit "% by vol. of the reactor offgas stream".

Within the reactor, the temperature is measured by means of pyrometer 18.

Characterization of the Granular Polycrystalline Silicon

The chlorine content in the bulk of the polysilicon is determined by instrumental neutron activation analysis (INAA) (SEMI PV10). The chlorine content in the bulk is measured in the unit "ppmw". Measurement by means of X-ray fluorescence spectroscopy (XRF) is also possible.

The nitrogen content in the bulk of the polysilicon is determined by secondary ion mass spectrometry (SIMS) (SEMI MF2139). The nitrogen content in the bulk is measured in the unit "ppba".

The particle size and the particle size distribution of the seed particles and of the product are determined by means of an optical particle size analyzer. For this purpose, dynamic image analysis according to the standard ISO/DIS 13322-2 is used. The mass-based median $x_{50,3}$ is used as a characteristic particle size.

The width of the particle size distribution is characterized using the coefficient of variation (CV), which is defined as follows:

$$CV = \frac{x_{84,3} - x_{16,3}}{2 \cdot x_{50,3}}$$

with the mass-based particle size $x_{84,3}$ wherein 84% of the particle distribution passes through the sieve,
and the mass-based particle size $x_{16,3}$ wherein 16% of the particle distribution passes through the sieve.

The sphericity is determined by means of dynamic image analysis to the standard ISO/DIS 13322-2.

The sphericity is defined as follows:

$$Sph = \frac{4 \cdot \pi \cdot A}{U^2}$$

with the projection area A and the projected circumference U of the particle.

The convexity is likewise determined by means of dynamic image analysis to the standard ISO/DIS 13322-2.

The convexity is defined as follows:

$$Conv = \sqrt{\frac{A}{A_{convex}}}$$

with the projection area A of the particle and the smallest convex area $A_{convex}$ that contains the projection area.

The convex area is obtained pictorially when a tape is used to cover the circumference of the particle without any indentations.

The surface roughness is determined by means of measurement with white light interferometry and appropriate evaluation to EN ISO 4287.

The color measurement is conducted to the standard DIN 5033-1 to -4.

The parameter used for the color is the HSL color space with the hue H, the saturation S and the lightness L.

The color is specified in the form:
Color=<H,S,L>=<"hue","saturation","lightness">.

The three parameters H, S and L can each assume a value range from 0 to 255, only integer values being permissible.

The measurements can be conducted, for example, with the PCE-RGB 2 spectrophotometer from PCE Deutschland GmbH.

Description of a Preferred Embodiment for Performance of the Process for Producing Granular Polycrystalline Silicon The fluidized bed reactor is initially charged with starting material in the form of silicon seed particles.

In a heating phase, the heating output is increased. Thus, the energy supplied to the reactor interior by the radiation heater is increased.

The energy is increased until a desired HCl content is present in the reactor offgas.

In addition, the seed particle metering rate is simultaneously adjusted such that the desired particle size is present in the product.

If both controlled variables—HCl content in the reactor offgas and particle size of the product—are within the target range, the fluidized bed reactor has reached the steady state.

In this state, the reactor gives an ideal product quality, and it is simultaneously ensured that the reactor produces in a stable and controlled manner and with a long running time.

A stable product quality is characterized in that the chlorine content in the product is within the range desired.

If the controlled variable of HCl content exceeds a particular limit, the reactor shuts down prematurely owing to an excessively high temperature level.

If the controlled variable of HCl content in turn goes below a particular limit, this leads to undesirably high chlorine contents in the product.

The deposition process controlled by means of a constant HCl value, as well as a low chlorine value, also surprisingly has a very positive effect on further product parameters, for example convexity, nitrogen content, particle size, particle size distribution, sphericity and color.

Preferred Control Method

In order to keep the product quality constant, i.e. the chlorine content in the product, a control characteristic is used.

Figure 2:
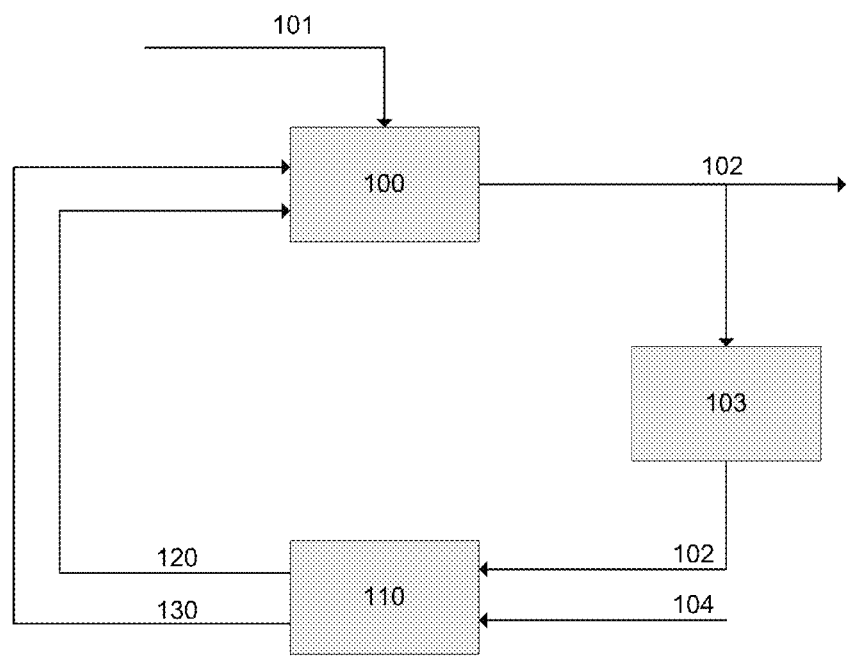
FIG. 2 shows a schematic of the control system.

This control system is shown schematically in FIG. 2.

Disrupting parameters 101, for example a varying seed particle metering rate, separation processes in the seed particle reservoir vessel or varying heating outputs, act on the control system 100.

The HCl content in the reactor offgas 102 constitutes the controlled variable.

It is measured by means of the gas chromatograph in the online analysis 103.

The input parameters for the controller 110 are the target value for the HCl content in the reactor offgas 104 and the actual value of the HCl content in the reactor offgas 102.

In the event of a control deviation, the control system acts by altering the manipulated variables. The manipulated variables used are the seed particle metering rate 120 and the reactor heating output 130.

In the primary control circuit, only the seed particle metering rate is altered.

If the control deviation exceeds a defined limit, the manipulated variable of heating output is additionally altered.

If the actual HCl value, for example, is too low, the seed particle metering rate is lowered.

If the actual HCl value additionally goes below a minimum limit, the reactor heating output is additionally raised.

If, in contrast, the actual HCl value is too high, the seed particle metering rate is increased.

If the actual HCl value additionally exceeds a maximum limit, the reactor heating output is additionally lowered.

Further Controlled Variables

The deposition of the granular polysilicon, in addition to the precursor $SiHCl_3$, can also be effected by means of precursors from the range of further trihalosilanes $SiHX_3$ where X=F, Br, I.

Therefore, in the performance of the process, the controlled variables used are generally offgas concentrations of hydrogen halides HX where X=F, Cl, Br, I.

In the case of use of $SiHCl_3$ for deposition, the product quality is defined essentially by the chlorine content.

If further trihalosilanes $SiHX_3$ where X=F, Br, I are used as precursors, this correspondingly has an effect on product qualities, such as fluorine content, bromine content or iodine content of the polysilicon.

EXAMPLES

In order to examine the performance (for example spattering) of the granular polysilicon produced in the context of this invention, Czochralski experiments were conducted.

The experimental parameters are summarized in Table 1.

TABLE 1

| | |
|---|---|
| Crucible charge | 40% granular polysilicon, 60% Siemens polysilicon |
| Heating ramp | Melting within 5 h linear to 1500° C. |
| Pulling temperature | 1430° C. |
| Pulling rate | 1.4 mm/min |
| Pressure | 980 mbar |
| Gas atmosphere | argon |

Figure 3:
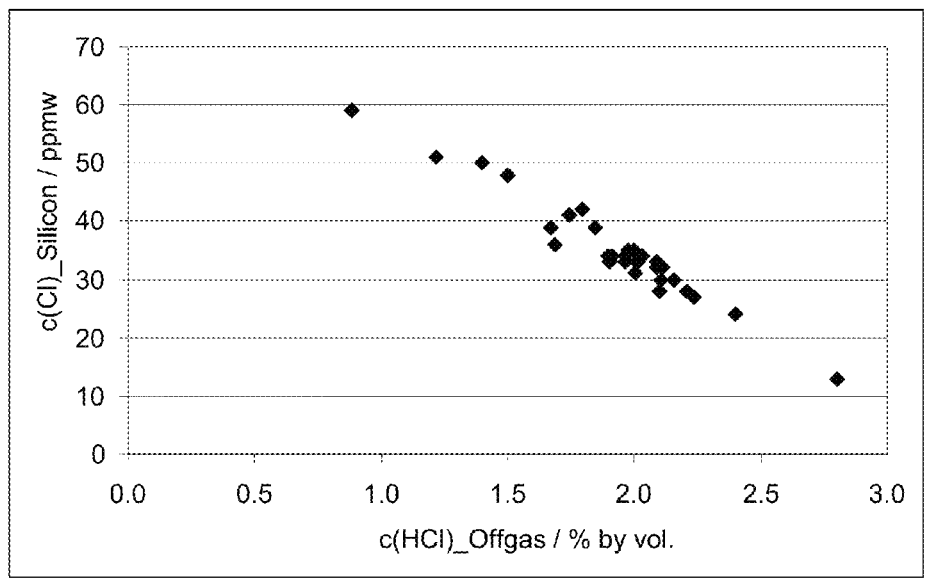
FIG. 3 shows the chlorine content in the silicon as a function of the HCl content in the reactor offgas.

FIG. 3 shows the chlorine content in the silicon as a function of the HCl content in the reactor offgas.

With rising HCl content in the reactor offgas, the chlorine content in the silicon decreases in an approximately linear relationship.

It is thus possible, through defined adjustment and monitoring of an HCl value, to achieve a defined chlorine content in the product.

For an illustrative chlorine range of 20 ppmw<c(Cl)<40 ppmw, for which it is known that the silicon used in crystal pulling does not tend to spatter, the HCl content in the fluidized bed deposition must accordingly be kept within the range of 1.8% by vol.<c(Cl)<2.5% by vol.

Table 2 shows examples 1-5 with all essential process and product parameters.

The examples were performed in a reactor having a diameter of 400 mm.

Reactor run time, seed particle metering rate and reactor heating output are reported as percentages, 100% of the reactor run time corresponding to 40 days, 100% of the seed particle metering rate to 1.5 kg/h and 100% of the reactor heating output to 130 kW.

Only examples 3-5 give granular polycrystalline silicon having a high convexity and a low chlorine content. With regard to convexity and chlorine content in the product, only examples 3-5 are accordingly inventive examples. In these examples, the process is optimized with regard to convexity and chlorine content by virtue of the controlled variable of HCl lying within the target range. The interplay of the manipulated variables of seed particle metering rate and reactor heating output is coherent.

Example 4 differs from example 3 by the reactor run time among other features. In example 3, the reactor run time is only 50% of the reactor run times of example 1 and 2.

In example 4, in contrast, the reactor run time is 200% of the reactor run times of example 1 and 2.

Example 5 likewise exhibits a somewhat shorter reactor run time than example 4.

Example 4 is thus the preferred variant in terms of the economical production of granular polycrystalline silicon.

Example 1 describes a process in which the HCl concentration in the offgas at 1.4% by volume is too low. Consequently, as shown in FIG. 3, the chlorine content in the product at 50 ppmw is too high. The product parameter of convexity (value 0.65) is also adversely affected toward lower values as a result of the non-optimized operating point. The cause of the low HCl content is a reactor heating output which is too low.

Example 2 describes a further process in which the HCl concentration in the offgas at 1.5% by volume is likewise too low. The consequence is a likewise increased chlorine content of 48 ppmw and a reduced convexity of 0.68. The cause of the low HCl content is an excessively high seed particle metering rate.

TABLE 2

| Example | 1 | 2 | 3 | 4 | 5 |
|---|---|---|---|---|---|
| Reactor pressure/bar g | 2.4 | 2.4 | 2.4 | 2.4 | 2.4 |
| Fluidized bed temperature/° C. | 900 | 910 | 980 | 950 | 1000 |
| Reactor heating output/% | 75 | 120 | 150 | 120 | 120 |
| Seed particle metering rate/% | 100 | 150 | 100 | 100 | 100 |
| HCl concentration in the offgas/% by vol. | 1.4 | 1.5 | 2.5 | 2.1 | 2.4 |
| Convexity/— | 0.65 | 0.68 | 0.990 | 0.999 | 0.999 |
| N concentration/ppba | 2120 | 2120 | 100 | 20 | 10 |
| Cl concentration/ppmw | 50 | 48 | 20 | 25 | 10 |
| Particle size/μm | 1220 | 1258 | 1250 | 1350 | 1350 |

TABLE 2-continued

| Example | 1 | 2 | 3 | 4 | 5 |
|---|---|---|---|---|---|
| Particle size distribution CV | 0.62 | 0.62 | 0.62 | 0.62 | 0.62 |
| Sphericity/— | 0.950 | 0.950 | 0.75 | 1.000 | 1.000 |
| Color/<H, S, L> | <50, 10, 120> | <50, 10, 120> | <50, 10, 120> | <50, 10, 120> | <50, 10, 120> |
| Reactor run time/% | 100 | 100 | 50 | 200 | 175 |

What is claimed is:

1. A process for producing a granular polycrystalline silicon in a fluidized bed reactor, comprising:
   fluidization of silicon seed particles by a gas flow in a fluidized bed which is heated by a heating apparatus,
   addition of a silicon- and halogen-containing reaction gas resulting in pyrolytic deposition of elemental silicon on heated surfaces of the seed particles,
   forming the granular polycrystalline silicon, with removal from the reactor of particles whose diameter has grown as a result of deposition and an offgas comprising hydrogen halide, and metered addition of fresh seed particles,
   wherein: (a) a concentration of hydrogen halide in the offgas is determined as a controlled variable; (b) and a rate of the metered addition of fresh seed particles and a heating output of the heating apparatus are controlled as manipulated variables, in order to keep the hydrogen halide concentration in the offgas within a defined range during operation; (c) the granular polycrystalline silicon has a chlorine content of 10-40 ppmw; and (d) the granular polycrystalline silicon comprises particles having a convexity of 0.850-1.000.

2. The process as claimed in claim 1, wherein the reaction gas is trichlorosilane and an HCl concentration is determined in the offgas.

3. The process as claimed in claim 2, wherein the HCl concentration in the offgas is kept at 1.8-2.5% by volume and the granular polycrystalline silicon prepared has a chlorine content of 10-25 ppmw.

4. The process as claimed in claim 1, wherein the HCl concentration in the offgas is kept at 1.8-2.5% by volume and the granular polycrystalline silicon prepared has a chlorine content of 10-25 ppmw.

5. The process as claimed in claim 1, wherein the convexity is 0.990-1.000.

6. The process as claimed in claim 1, wherein the chlorine content is 10-25 ppmw.

7. The process as claimed in claim 1, wherein the granular polycrystalline silicon has a nitrogen content of 10-100 ppba.

8. The process as claimed in claim 1, wherein the particles have different sizes of 150-10,000 μm, and wherein a mass-based median of a particle size distribution is 850-2000 μm.

9. The process as claimed in claim 8, wherein a coefficient of variation of the particle size distribution is 0.4 to 0.7.

* * * * *